United States Patent
Huang

(10) Patent No.: US 9,464,756 B2
(45) Date of Patent: Oct. 11, 2016

(54) EARPHONE ASSEMBLY AND HEAD STRAP THEREOF

(71) Applicant: Chiun Mai Communication Systems, Inc., New Taipei (TW)

(72) Inventor: Po-Sen Huang, New Taipei (TW)

(73) Assignee: Chiun Mai Communication Systems, Inc., New Taipei (TW)

( * ) Notice: Subject to any disclaimer, the term of this patent is extended or adjusted under 35 U.S.C. 154(b) by 0 days.

(21) Appl. No.: 14/587,523

(22) Filed: Dec. 31, 2014

(65) Prior Publication Data
US 2016/0112788 A1   Apr. 21, 2016

(30) Foreign Application Priority Data
Oct. 15, 2014   (CN) .......................... 2014 1 0544060

(51) Int. Cl.
*H04R 25/00*   (2006.01)
*F16M 13/04*   (2006.01)
*H04R 1/10*   (2006.01)
*H04R 5/033*   (2006.01)

(52) U.S. Cl.
CPC ............ *F16M 13/04* (2013.01); *H04R 1/1066* (2013.01); *H04R 5/0335* (2013.01)

(58) Field of Classification Search
CPC ......... H04R 1/10; H04R 1/105; F16M 13/04
See application file for complete search history.

(56) References Cited

U.S. PATENT DOCUMENTS

| | | | |
|---|---|---|---|
| 6,130,953 A * | 10/2000 | Wilton | H04M 1/05 379/430 |
| 2013/0177195 A1* | 7/2013 | Sze | H04R 1/1033 381/384 |

* cited by examiner

*Primary Examiner* — Tuan D Nguyen
(74) *Attorney, Agent, or Firm* — Zhigang Ma

(57) ABSTRACT

A head strap includes a head band and a pair of holders. The pair of holders are connected to two ends of the head band. Each of the pair of holders includes a receiving portion. The receiving portion defines a receiving cavity with a cutout. The disclosure also provides an earphone assembly.

12 Claims, 4 Drawing Sheets

EARPHONE ASSEMBLY AND HEAD STRAP THEREOF

FIELD

The subject matter herein generally relates to head strap and earphone assemblies, and particularly to a head strap with an earphone worn on a head of a user and an earphone assembly having the head strap.

BACKGROUND

In-ear phones (or ear buds) are popular and used by people to obtain audio signals from electronic devices because of their relatively small size.

BRIEF DESCRIPTION OF THE DRAWINGS

Implementations of the present technology will now be described, by way of example only, with reference to the attached figures.

DETAILED DESCRIPTION

Figure 1:
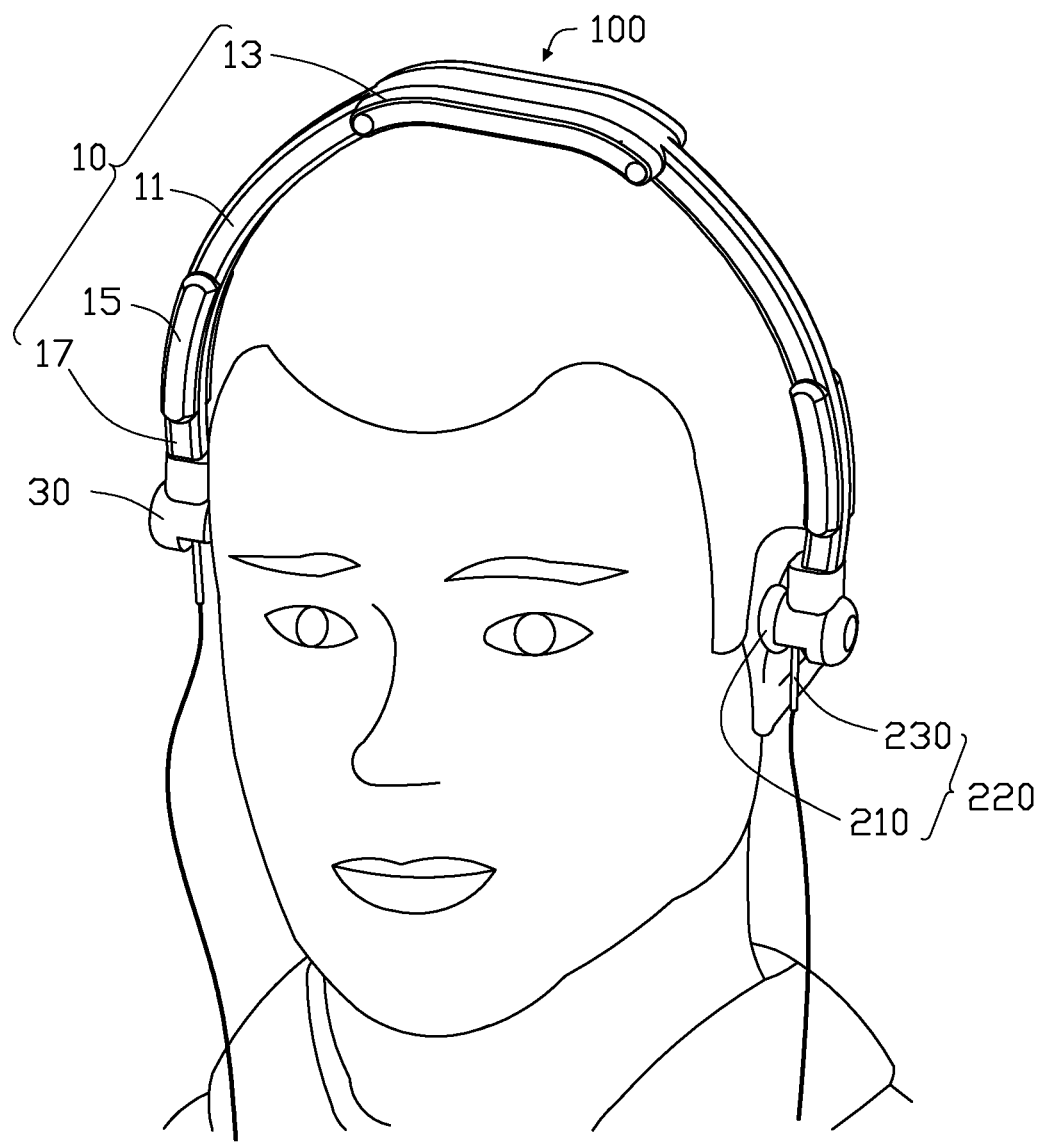
FIG. 1 is an isometric view of an earphone assembly worn on a head of a user, according to an exemplary embodiment.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures, and components have not been described in detail so as not to obscure the related relevant feature being described. Also, the description is not to be considered as limiting the scope of the embodiments described herein. The drawings are not necessarily to scale and the proportions of certain parts have been exaggerated to better illustrate details and features of the present disclosure.

Several definitions that apply throughout this disclosure will now be presented.

The term "substantially" is defined to be essentially conforming to the particular dimension, shape, or other feature that the term modifies, such that the component need not be exact. For example, "substantially cylindrical" means that the object resembles a cylinder, but can have one or more deviations from a true cylinder.

The term "comprising," when utilized, means "including, but not necessarily limited to"; it specifically indicates open-ended inclusion or membership in the so-described combination, group, series and the like.

FIG. 1 is an isometric view of an earphone assembly worn on the head of a user, according to an exemplary embodiment. The earphone assembly includes a head strap 100 and an earphone 220. The earphone 220 can be assembled to the head strap 100 and worn on the head of the user by the head strap 100.

The earphone 200 includes a pair of receivers. Each receiver includes an earphone body 210 and an earphone rod 230 connected to the earphone body 210. The earphone bodies 210 can be attached to the ears of the user.

Figure 2:
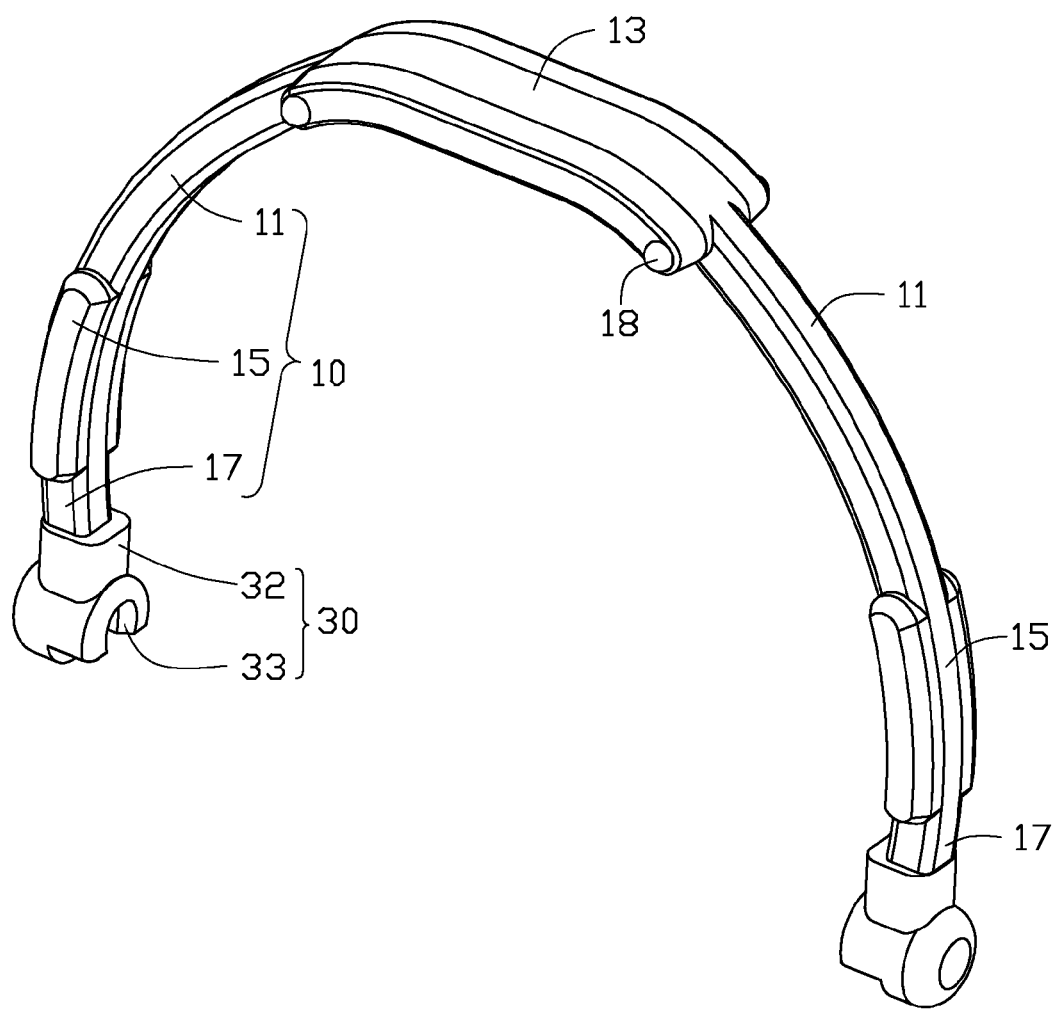
FIG. 2 is an isometric view of a head strap of the earphone assembly of FIG. 1.
Figure 3:
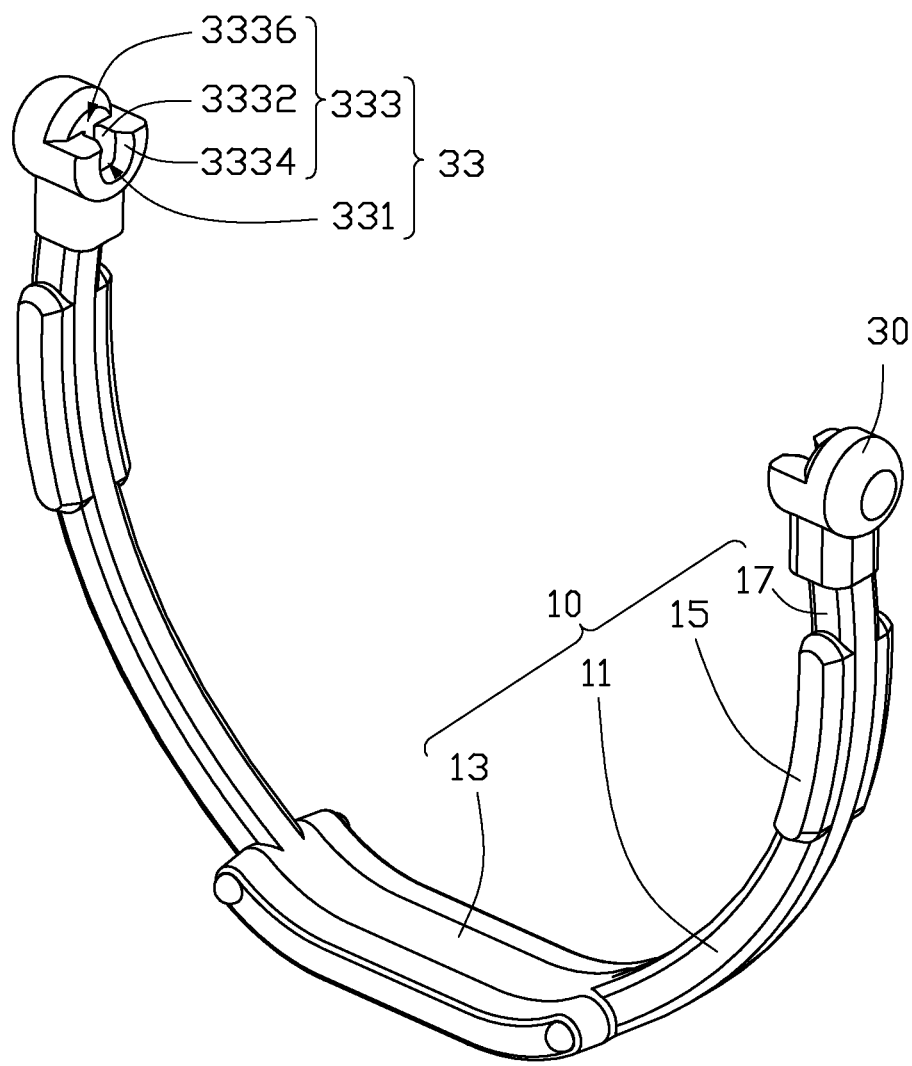
FIG. 3 is similar to FIG. 2, but shown from another angle.

FIGS. 2 and 3 illustrate that the head strap 100 includes a head band 10 and a pair of holders 30 connected to two ends of the head band 10. The head band 10 is substantially a U-shaped frame suitable to fit the head of the user. The head band 10 includes two first head band portions 11, a first telescopic member 13, two second telescopic members 15, and two second head band portions 17. The first head band portions 11 are rotatably connected to two ends of the first telescopic member 13 by two hinges 18. Each second head band portion 17 is connected an end of one of the first head band portions 11 opposite to the first telescopic member 13 by one of the second telescopic members 15. A width and a length of the head band 10 can be adjusted by the first telescopic member 13 and the second telescopic members 15.

Each holder 30 is configured for receiving one of the receivers. Each holder 30 includes a connecting portion 32 and a receiving portion 33. The receiving portion 33 can be integrated with the connecting portion 32 when the connecting portion 32 and the receiving portion 33 are made of the same material and adhered to connecting portion 32. When the connecting portion 32 and the receiving portion 33 are made of different materials, the receiving portion 33 and the connecting portion 32 can be adhered together. In this exemplary embodiment, the receiving portion 33 is made of elastic material.

An end of the connecting portion 32 is connected to the receiving portion 33. Another end of the connecting portion 32 is connected to one of the second head band portions 17. The receiving portion 33 is substantially a cylinder and includes two opposite side surfaces and a peripheral surface interconnecting the side surfaces. A substantially circular receiving slot 331 is defined in one of the side surfaces to define a cylindrical receiving cavity 333 configured for receiving one of the earphone bodies 210. The receiving cavity 333 includes a resisting surface 3332 and a guiding surface 3334. The resisting surface 3332 is a portion of an inner surface of the receiving cavity 333. The resisting surface 3332 tightly surrounds and resists against the earphone body 210 received in the receiving cavity 333. The guiding surface 3334 is an inclined surface formed between the resisting surface 3332 and the side surface having the receiving slot 331. The guiding surface 3334 is configured for allowing the earphone body 210 into the receiving cavity 333. A cutout 3336 is defined in the receiving cavity 333 opposite to the head band 10, and communicating with the receiving slot 333. The earphone rod 230 can be extended through the cutout 3336. Shapes of the receiving slot 331 and the cutout 3336 can be designed for the earphone bodies 210.

In assembly, the earphone body 210 of each receiver is entered into one of the receiving cavities 333 through the guiding surface 3334. The resisting surface 3332 tightly surrounds and resists against the earphone body 210 received in the receiving cavity 333. The earphone rod 230 is extended through the corresponding cutout 3336. Therefore, the earphone 200 is assembled to the head strap 100. The earphone assembly can be worn on the head of the user with the head strap 100.

In use, the first telescopic member 13 and the second telescopic members 15 can be adjusted to make the length and the width of the head band 10 suitable for the user. The first head band portions 11 are rotated relative to the first telescopic member 13 by the hinges 18 so that the head band 10 can be easily worn on the head of the user. The hinges 18 exert spring forces on the first head band portions 11 to make the earphone bodies 210 closely attached to the ears of the user. Therefore, the earphone bodies 210 cannot be easily dislodged.

Figure 4:
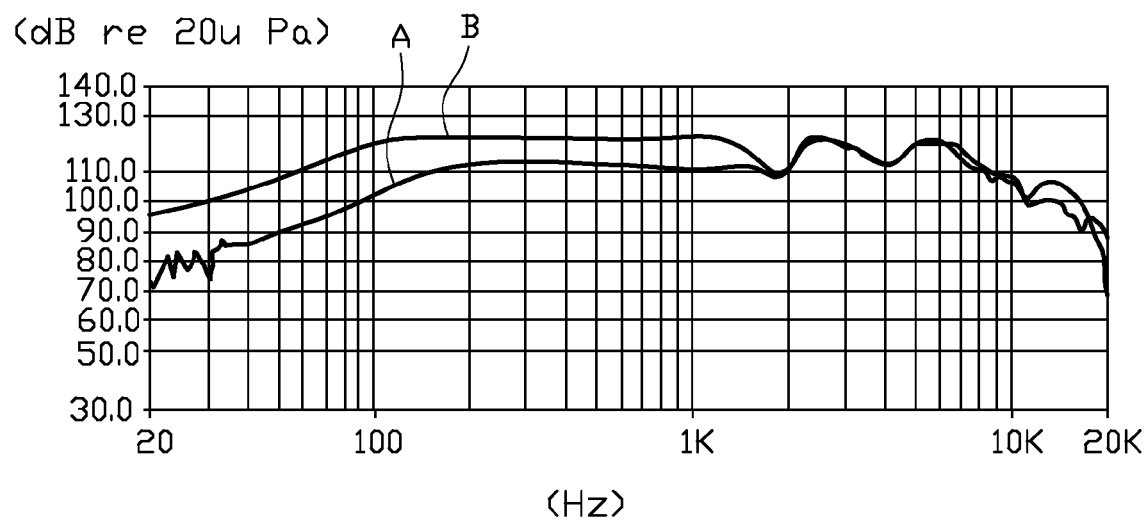
FIG. 4 is a diagram showing sound intensity measurements of an earphone with the head strap of FIG. 2 and an earphone without the head strap of FIG. 2.

In addition, FIG. 4 shows that curve A denotes sound intensity of the earphone 220 when used without the head strap 100 and curve B denotes sound intensity of the earphone 220 when used with the head strap 100. According to the test results, the earphone 220 can obtain a relative better sound effect when the earphone 220 is used with the head strap 100 because gaps between the earphone 220 and the ears of the user are reduced.

It is to be understood, however, that even through numerous characteristics and advantages of the present disclosure have been set forth in the foregoing description, together with details of assembly and function, the disclosure is illustrative only, and changes may be made in details, especially in the matters of shape, size, and arrangement of parts within the principles of the disclosure to the full extent indicated by the broad general meaning of the terms in which the appended claims are expressed.

What is claimed is:

1. A head strap comprising:
   a head band; and
   a pair of holders connected to two ends of the head band, the pair of holders configured for receiving a pair of receivers of an earphone, each of the pair of holders comprising a receiving portion, the receiving portion defining a receiving cavity having a cutout, wherein the receiving cavity comprises a resisting surface and a first side surface extending from the resisting surface, the first side surface seals one side of the receiving cavity.

2. The head strap of claim 1, wherein the head band comprises two first head band portions and a first telescopic member, the two first head band portions being rotatably connected to two ends of the first telescopic member by two hinges.

3. The head strap of claim 2, wherein the head band further comprises two second head band portions and two second telescopic members, each second head band portion is connected to an end of one of the two first head band portions opposite to the first telescopic member by one of the second telescopic members.

4. The head strap of claim 3, wherein each of the pair of the holders further comprises a connecting portion, an end of the connecting portion is connected to the receiving portion, another end of the connecting portion is connected to one of the two second head band portions.

5. The head strap of claim 1, wherein the receiving portion defines a receiving slot in a second side surface opposite to the first side surface of the receiving portion to form the receiving cavity, the receiving slot communicates with the cutout.

6. The head strap of claim 5, wherein the receiving portion further comprises an inclined guiding surface formed between the resisting surface and the second side surface having the receiving slot.

7. An earphone assembly comprising:
   an earphone comprising a pair of receivers, each receiver comprising an earphone body and an earphone rod; and
   a head strap, the head strap comprising:
   a head band; and
   a pair of holders connected to two ends of the head band, the pair of holders configured for receiving the pair of receivers of an earphone, each of the pair of holders comprising a receiving portion, the receiving portion defining a receiving cavity having a cutout, each earphone body being detachably received in one of the receiving cavities, each earphone rod extended through one of the cutouts, wherein the receiving cavity comprises a resisting surface and a first side surface extending from the resisting surface, the first side surface seals one side of the receiving cavity, the resisting surface resists against the earphone body received in the receiving cavity.

8. The earphone assembly of claim 7, wherein the head band comprises two first head band portions and a first telescopic member, the two first head band portions are rotatably connected to two ends of the first telescopic member by two hinges.

9. The earphone assembly of claim 8, wherein the head band further comprises two second head band portions and two second telescopic members, each second head band portion is connected to an end of one of the two first head band portions opposite to the first telescopic member by one of the second telescopic members.

10. The earphone assembly of claim 9, wherein each of the pair of the holders further comprises a connecting portion, an end of the connecting portion is connected to the receiving portion, another end of the connecting portion is connected to one of the two second head band portions.

11. The earphone assembly of claim 7, wherein the receiving portion defines a receiving slot in a second side surface opposite to the first side surface of the receiving portion to form the receiving cavity, the receiving slot communicates with the cutout.

12. The earphone assembly of claim 11, wherein the receiving portion further comprises an inclined guiding surface formed between the resisting surface and the second side surface having the receiving slot.

\* \* \* \* \*